Jan. 28, 1947. R. H. BEAZLEY 2,414,849
AIRCRAFT WHEEL SPINNER AND CONTROL
Filed Dec. 8, 1944
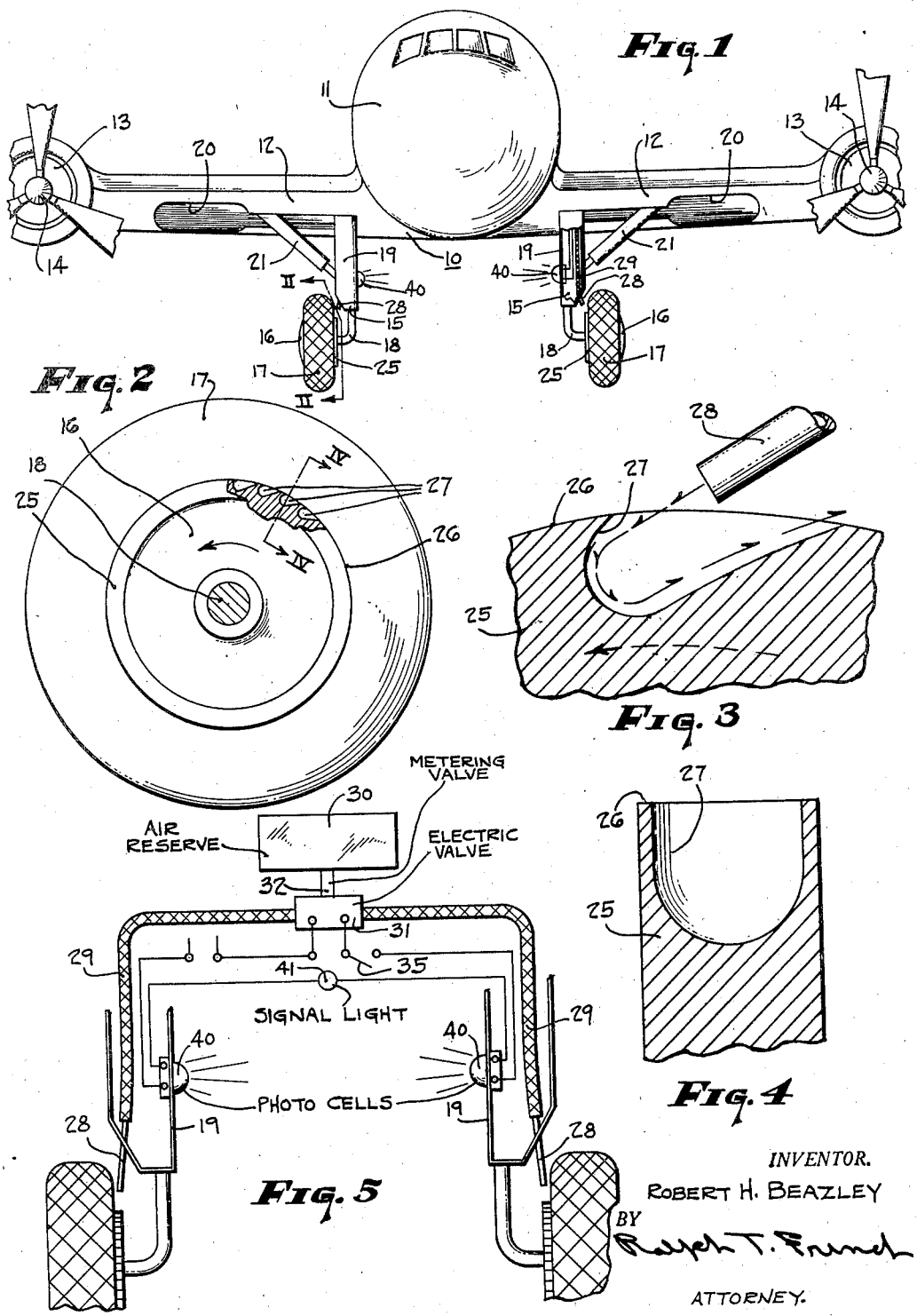
INVENTOR.
ROBERT H. BEAZLEY
BY
ATTORNEY.

Patented Jan. 28, 1947

2,414,849

UNITED STATES PATENT OFFICE 2,414,849

AIRCRAFT WHEEL SPINNER AND CONTROL

Robert H. Beazley, Essex, Md.

Application December 8, 1944, Serial No. 567,167

6 Claims. (Cl. 244—103)

This invention relates to aircraft, more particularly to landing gear therefor, and has for an object to provide improved apparatus of this character.

Another object of the invention is to provide, in aircraft equipped with retractable landing gear, means for indicating to the pilot of the aircraft, when the landing gear is in fully extended position and therefore safe for landing of the aircraft.

In the landing of large aircraft of a size requiring a plurality of engines, for example, bombers, transports or commercial airliners, a serious problem is involved in the sudden contact of the landing wheels with the ground. Inasmuch as such aircraft usually land at speeds of from eighty to one hundred miles per hour, the sudden contact of the non-rotating wheels with the ground, at such speeds, results in terrific strain and wear on the pneumatic tires with which such wheels are equipped. A total of five or six landings is often considered a fair life for such tires.

Various means have been proposed for overcoming this difficulty, but none has proved entirely satisfactory. For example, cups or vanes have been mounted on the tires or wheels in such a manner that the relative wind acting thereon initiates and maintains rotation of the wheels after the landing gear has been lowered. Another way of imparting initial rotation to the wheels has been to provide a surface on which the wheels roll during lowering of the landing gear, to initiate their rotation for contact with the ground.

Both of these means of rotating the wheels prior to landing of the aircraft, as well as other known methods have various disadvantages.

Obviously, during landing it is desirable that the wheels be rotating at a rate corresponding, as nearly as possible, to the landing speed of the aircraft, in order to avoid skidding of the tires off the ground.

Further, for reasons of safety, the landing gear should be lowered while the aircraft is a considerable distance above the ground in order that, in the event of trouble developing in the lowering of the landing gear, there be ample opportunity to regain altitude until the difficulty can be overcome. However, it is also desirable to delay, until the last practical moment, instituting rotation of the wheels, so as to avoid, insofar as possible, gyroscopic effects of such rotation upon the aircraft.

With landing wheels three feet in diameter on an aircraft landing at a speed of ninety miles per hour, the wheels should be rotating at approximately 840 revolutions per minute. It will be apparent that a pair of wheels weighing several hundred pounds each and rotating in parallel planes at speeds of more than 800 revolutions per minute, will produce considerable gyroscopic action, and that such action may well interfere seriously with safe handling of the aircraft during the landing operation.

Therefore, it is an object of the present invention to provide means for bringing the rotational speed of aircraft landing wheels up to that corresponding to the landing speed of the aircraft, both rapidly and positively.

Another object of the invention is to provide means for positively rotating the landing wheels of aircraft after the landing gear has been lowered, said means being operable at the will of the pilot, and independently of the act of lowering the landing gear.

Yet another object of the invention is to provide, in association with retractable landing wheels of an aircraft, an elastic fluid motor for imparting rotation to the wheels, together with means for conducting to the motor, motive fluid from a source of supply carried by the aircraft.

A further object of the invention is to provide, in association with retractable landing wheels of an aircraft, which wheels are adapted to be rotated by an elastic fluid utilizing device, means for preventing operation of the elastic fluid utilizing device when the wheels are in other than fully extended position relative to the aircraft.

Another object of the invention is to provide, in an aircraft having retractable landing gear and a supply of compressed air, means for utilizing said air to cause rotation of the landing wheels prior to contact of the wheels with the ground during landing operations.

Yet another object of the invention is to provide, in an aircraft having landing wheels and a source of gas at superatmospheric pressure, means for utilizing gas from said source for causing rotation of the wheels while the aircraft is in the air.

Yet another object of the invention is to provide, in an aircraft having landing wheels and a source of gas under superatmospheric pressure, means for utilizing gas from said source to rotate the wheels while the aircraft is in the air, together with metering means for delivering to the gas-utilizing means a measured quantity of the gas, to produce a selected rotational speed of the landing wheels.

A further object of the invention is to provide, in an aircraft having landing wheels, an annular member carried by each wheel and having a circumferential series of pockets, together with a nozzle for each series, with the pockets so shaped and so disposed with respect to the nozzle and the direction of rotation of the wheels, that a stream of motive fluid delivered through the nozzle to the pockets produces forward rotation of the wheels and rearward discharge of the motive fluid exhausted from the pockets as they pass the nozzle.

Another object of the invention is to provide, in an aircraft having retractable landing wheels and means for positively rotating the wheels, photo-electric control apparatus for preventing operation of the last-mentioned means at all times that the landing wheels are not in fully extended position.

Another object of the invention is to provide, in an aircraft having retractable landing wheels and means for positively rotating said wheels, photo-electric control apparatus for automatically causing operation of the wheel-rotating means upon movement of the landing wheels from retracted position to fully extended position.

These and other objects are effected by the invention as will be apparent from the following description and claims taken in accordance with the accompanying drawing, forming a part of this application, in which:

Fig. 1 is a front elevational view of an aircraft having retractable landing gear embodying the principles of the present invention, end portions of the wings being broken away;

Fig. 2 is an enlarged sectional view, taken along the line II—II of Fig. 1, looking in the direction indicated by the arrows, a portion of the structure being broken away for the sake of clearness;

Fig. 3 is an enlarged, fragmentary, sectional view through one of the pockets shown in Fig. 2;

Fig. 4 is an enlarged, fragmentary, sectional view, taken along the line IV—IV of Fig. 2, looking in the direction indicated by the arrows; and Fig. 5 is a diagrammatic view of aircraft landing gear, such as shown in Fig. 1, and embodying the invention, together with a suitable control system therefor.

Referring now to the drawing more in detail, particularly to Fig. 1 thereof, the reference character 10 indicates, in its entirety, an aircraft, including a fuselage 11, wings 12, motor assemblies 13 mounted in the wings and adapted to drive the propellers 14, and landing gear 15.

In the arrangement herein illustrated, the landing gear 15 comprises a pair of wheels 16 on which are mounted pneumatic tires 17, the wheels being rotatably mounted on axles 18 extending downwardly from the lower ends of the landing gear struts 19. Preferably, each strut 19 is pivotally connected at its upper end to one of the wings 12, and is adapted to be retracted into, and extended from, a strut and wheel receiving recess 20 in the lower surface of the wing, by a hydraulically-operated rod 21.

The construction so far described is considered conventional and, by itself, forms no part of the present invention.

In order that the wheels 16 may be caused to rotate on the axles 18, prior to contact of the tires 27 with the ground during landing operations, each wheel has mounted thereon, preferably at the side adjacent the strut 19, an annular member 25, concentric with the axle 18.

The annular member 25 has, formed in its outer periphery 26, a circumferential series of pockets or recesses 27, opening rearwardly through the peripheral surface 26 relative to the direction of rotation of the wheel, indicated by the arrows in Figs. 2 and 3.

A nozzle 28 extends downwardly and forwardly (Figs. 1 and 3) and is supplied, through suitable flexible conduits 29, with motive fluid from a source of supply carried by the aircraft. Most aircraft of the character described carry tanks of compressed air as an auxiliary means of operating the landing gear and wheel brakes, in the event of failure of the hydraulic system normally relied upon for these functions. This air is usually at a pressure in excess of 500 pounds per square inch.

Such a tank of compressed air is shown diagrammatically at 30, in Fig. 5, and the flexible conduits 29 are connected thereto through an electrically-operated valve 31. Under certain conditions it may be desirable to provide an additional metering valve 32 between the tank 30 and the electrically-operated valve 31 or elsewhere in the system, for a purpose to be hereinafter described.

The valve 31 may be operated from a remote point, preferably at the pilot's seat, by closing the switch 35 to energize the circuit 36. Upon opening of the valve 31, air at a pressure in excess of 500 pounds per square inch will pass from the tank 30, through the conduits 29 to the nozzles 28, for discharge therefrom into the pockets 27, in the manner illustrated in Fig. 3.

It will be noted from Fig. 3 that the air is directed forwardly into the pockets to rotate the wheel in the direction indicated by the arrows, which is also the direction of flight of the aircraft, and discharges from the pockets in a direction rearwardly of the flight of the aircraft, whereby the discharging stream joins with, rather than opposes, the flow of atmospheric air past the wheels.

It should be noted that the nozzles 28 and the adjacent sections of flexible conduit are directed downwardly when the landing gear is in extended position, with the result that condensation and other moisture may freely drain therefrom and prevent freezing of the air line.

The electrical control circuit, by which the pilot initiates rotation of the wheels, includes a safety feature, by which the circuit opening the valve 31 is automatically broken or interrupted at all times that the wheels are not in fully extended position. This feature results from the provision of a pair of photo electric cells 40, one on the inner side of each landing gear strut 19, and disposed directly opposite each other, so that, when the landing gear is in fully extended position, the photo electric cells cooperate to energize and close the electric circuit of the valve 31, assuming the switch 35 is closed. If either of the wheels 16 is other than in fully extended position relative to the aircraft, the cells 40 will be non-aligned and the circuit interrupted so that no air or other operating medium can flow to the pockets 27 to rotate the wheels.

A warning or signal light 41 may be included in the photo electric cell circuit, with the result that the pilot may determine whether or not the landing gear is in fully extended position simply by momentarily closing the switch 35. The signal 41 will light if the photo electric portion of the circuit is closed, and this can occur only with the landing gear in fully extended position.

As suggested above, it may be found desirable to include in the system a measuring valve 32, which may be adjusted to pass only a predetermined desired quantity of air to the wheels. Preferably, the predetermined quantity of air metered to the wheels would be just that sufficient to bring them up to the rotative speed corresponding to the landing speed of the aircraft. In lieu of a metering valve, a tank 30 may be used which contains only sufficient air to produce the desired rotative speed of the wheels.

It will be apparent to those skilled in this art that with air in the tank 30 at a pressure of 500 pounds per square inch or higher, as is customary with the auxiliary service for which this air is normally provided, the wheels can be brought up to around 800 revolutions per minute, the rotative speed best suited for normal landing operations, in a period of seconds, totaling only a fraction of a minute.

Throughout this specification, the term "ground" is intended to include any surface on which an aircraft might attempt to land, such as the deck of an aircraft carrier, a floating landing field in midocean, the roofs of buildings, etc.

Although compressed air is considered the preferred medium for operating the wheel-rotating means when it is already available, it is obvious that other medium may be used, for example, the exhaust gases of the motors 13.

While in the construction herein illustrated, the aircraft is provided with two wheels 16, it will be apparent that the invention may be applied to aircraft with any number of wheels, including one or more.

While the invention has been shown in but one form, it will be apparent that it is not so limited, but is susceptible of various modifications and arrangements of parts.

What is claimed is:

1. In an aircraft, a pair of axially aligned landing wheels, mechanism mounting said wheels for movement between extended and retracted positions relative to the aircraft, means for imparting rotary movement to the wheels prior to contact of the latter with the ground during landing of the aircraft, and means for delaying functioning of the last-mentioned means until said wheels are in fully-extended position.

2. In an aircraft, a pair of landing wheels, a pair of independent leg struts mounting said wheels for movement between extended and retracted positions relative to the aircraft, means for rotating said wheels prior to contact thereof with the ground during landing of the aircraft, and means automatically limiting operation of the last-mentioned means to such times as both of said wheels are in fully-extended position.

3. In an aircraft, a landing wheel, means mounting said wheel on the aircraft for movement between extended and retracted positions relative to said aircraft, a receptacle for fluid under superatmospheric pressure, means for conducting fluid from said receptacle to the wheel, means associated with the wheel for utilizing the fluid to impart rotary motion to the wheel prior to contact of the latter with the landing surface upon landing of the aircraft, and means operative at all times that the wheel is in other than fully-extended position relative to the aircraft to prevent passage of fluid to the wheel to impart rotary motion thereto.

4. Structure as specified in claim 3, including means for delivering a measured quantity of fluid to the fluid-utilizing means associated with the wheel, whereby the wheel may be rotated at approximtely any selected number of revolutions per minute corresponding to the landing speed of the aircraft.

5. In an aircraft, a pair of landing wheels; means mounting said wheels on the aircraft for movement between retracted and extended positions; means associated with said wheels for imparting rotary motion thereto; an electrical control circuit for said rotation-imparting means; and photo-electric cells carried by said wheel-mounting means and adapted, when either of said wheels is out of fully-extended position, to interrupt said electrical control circuit.

6. Structure as specified in claim 5, including means responsive to action of the photo-electric cells for indicating that the electrical control circuit is interrupted due to incomplete extension of one of the landing wheels.

ROBERT H. BEAZLEY.